United States Patent
Fallahi et al.

(10) Patent No.: US 8,643,218 B2
(45) Date of Patent: Feb. 4, 2014

(54) MINIMIZING SATURATION CAUSED BY POWER TRANSFER IN A COMMUNICATION SYSTEM TRANSFORMER

(75) Inventors: Siavash Fallahi, Newport Coast, CA (US); Kevin Brown, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 2167 days.

(21) Appl. No.: 11/495,677

(22) Filed: Jul. 31, 2006

(65) Prior Publication Data

US 2007/0280471 A1    Dec. 6, 2007

Related U.S. Application Data

(60) Provisional application No. 60/810,151, filed on Jun. 2, 2006.

(51) Int. Cl.
*H04M 1/00*    (2006.01)

(52) U.S. Cl.
USPC .............................................. 307/101; 307/1

(58) Field of Classification Search
USPC ................................................ 307/1–4, 101
See application file for complete search history.

(56) References Cited

U.S. PATENT DOCUMENTS

| | | | |
|---|---|---|---|
| 5,796,279 A | 8/1998 | Umeda et al. | |
| 2006/0119478 A1* | 6/2006 | Karam et al. | 340/538 |

FOREIGN PATENT DOCUMENTS

| | | | | |
|---|---|---|---|---|
| CA | 922783 | * | 3/1973 | ............... H02J 3/38 |
| EP | 0058470 A1 | | 8/1982 | |
| WO | WO 2006/052360 A1 | | 5/2006 | |

OTHER PUBLICATIONS

Rafeeque, K. P. Sunil, "Area Efficient Current Steering DAC Using Current Tuning", Circuits and Systems, 2002, APCCAS '02, vol. 1, 2002, pp. 559-564.

Search Report for European Patent Application No. 07003365.9 dated May 3, 2007, 4 pages.

\* cited by examiner

*Primary Examiner* — Fritz M Fleming (74) *Attorney, Agent, or Firm* — Sterne, Kessler, Goldstein & Fox P.L.L.C.

(57) ABSTRACT

A method and apparatus that minimizes saturation caused by power transfer in a communication system transformer, such as a transformer found in a Power-over-Ethernet system. A magnetic flux imbalance causing saturation in the transformer is detected. A compensation current is injected into a winding to minimize the magnetic flux imbalance and saturation.

17 Claims, 9 Drawing Sheets

FIG. 9

MINIMIZING SATURATION CAUSED BY POWER TRANSFER IN A COMMUNICATION SYSTEM TRANSFORMER

CROSS REFERENCE TO RELATED APPLICATIONS

This application claims benefit of U.S. Provisional Patent No. 60/810,151, filed on Jun. 2, 2006, which is incorporated by reference herein in its entirety.

FIELD OF THE INVENTION

The present invention is generally directed to communication systems. More particularly, the invention relates to minimizing saturation caused by power transfer in a communication system transformer.

BACKGROUND OF THE INVENTION

Recent advances in communication network technology are driving demand for remote devices that are coupled to a communication network. This drives a need to power these remote devices. One method of providing power to a remote device is over a hardwired communication network connection. Typical remote devices are internet protocol phones and wireless access points.

Figure 1:
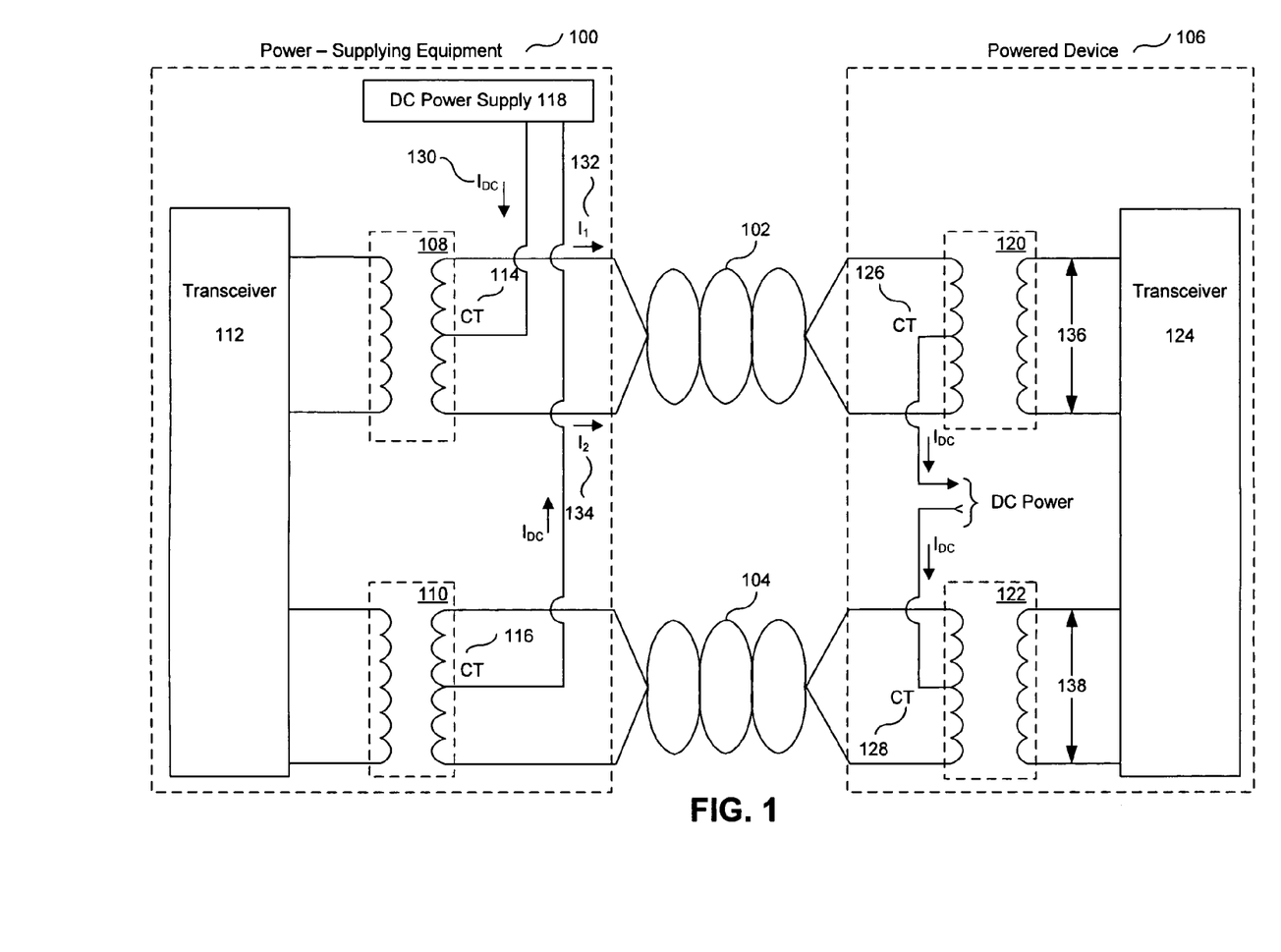
FIG. 1 illustrates conventional power transfer over a communication system.

FIG. 1 shows a circuit for power transfer over a typical communication system connection to a powered device 106 that is remotely located relative to power-supplying equipment 100. The power-supplying equipment 100 provides direct current (DC) over a first pair of communication conductors 102 and a second pair of communication conductors 104 to a powered device 106. The first pair of communication conductors 102 and the second pair of communication conductors 104 typically are a twisted pair conductor, for example, those twisted pair conductors found in an Ethernet cable. The power-supplying equipment 100 has a first transformer 108 and a second transformer 110 that provide for transport of communication signals to the first pair of communication conductors 102 and the second pair of communication conductors 104 from a power-supplying equipment transceiver 112. The first transformer 108 has a first center tap 114. The second transformer 110 has a second center tap 116. The first center tap 114 and the second center tap 116 are connected to a DC power supply 118 within the power-supplying equipment 100 on the sides of the first transformer 108 and the second transformer 110 that are connected respectively to the first pair of communication conductors 102 and the second pair of communication conductors 104.

The powered device 106 has a third transformer 120 and a fourth transformer 122 that connect a powered device transceiver 124 to the first pair of communication conductors 102 and the second pair of communication conductors 104. The third transformer 120 has a third center tap 126. The fourth transformer 122 has a fourth center tap 128. The powered device 106 receives DC power from the third center tap 126 and the fourth center tap 128 over the first pair of conductors 102 and the second pair of conductors 104.

During ideal operation, a direct current ($I_{DC}$) 130 flows from the DC power supply 118 through the first center tap 114, divides into a first current ($I_1$) 132 and a second current ($I_2$) 134 carried on the first pair of communication conductors 102. The first current ($I_1$) 132 and the second current ($I_2$) 134 then recombine at the third center tap 126 to reform the direct current ($I_{DC}$) 130 to power the powered device 106. On return, the direct current ($I_{DC}$) 130 flows from the powered device 106 through the fourth center tap 128, divides between two conductors in the second pair of communication conductors 104, recombines at the second center tap 116, and returns to the DC power supply 118. While power is being supplied, a first communication signal 136 and/or a second communication signal 138 are simultaneously carried via the first pair of communication conductors 102 and/or the second pair of communication conductors 104.

Figure 2:
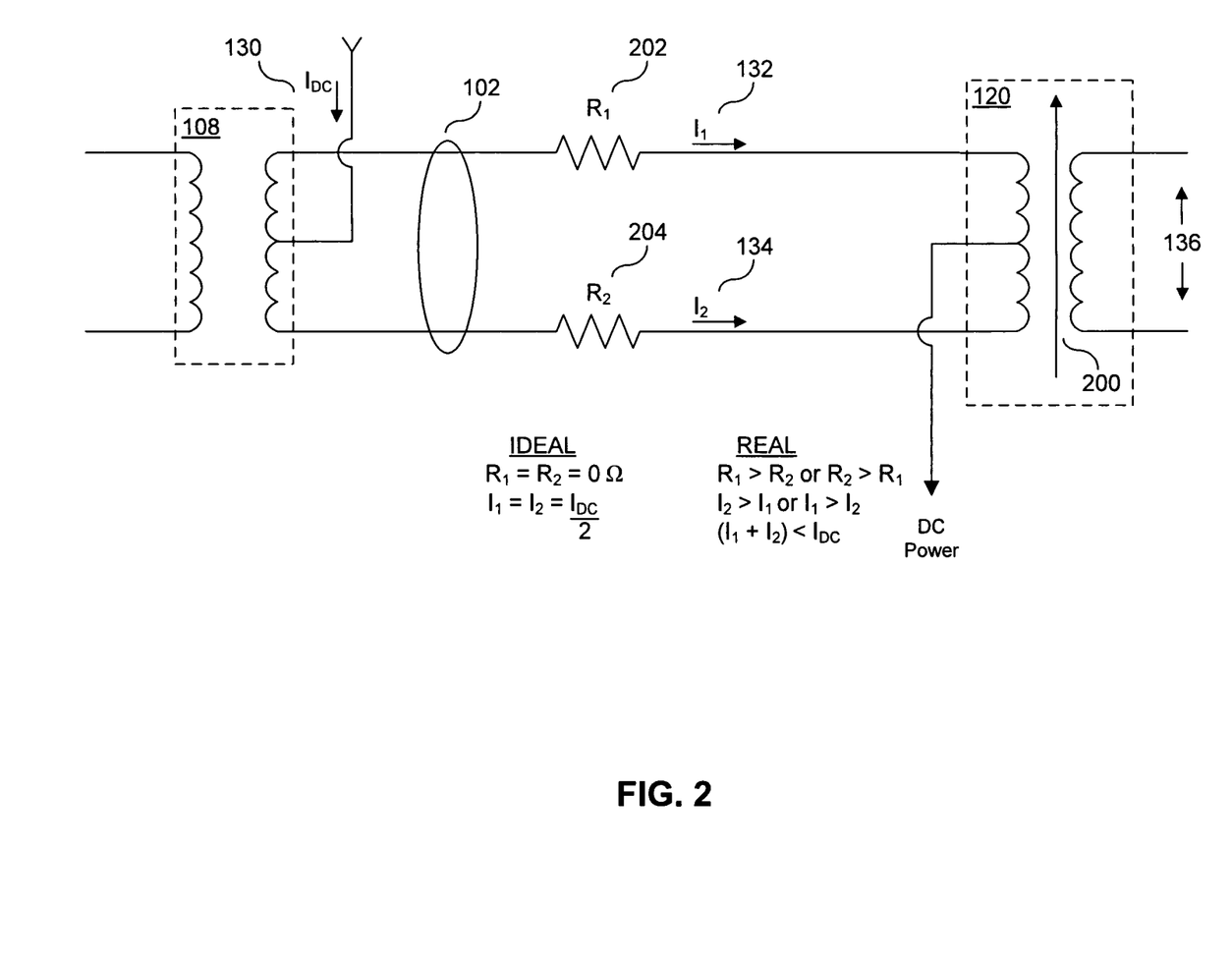
FIG. 2 illustrates problems with previous power transfer configurations.

FIG. 2 shows the problems with this system on the direct current ($I_{DC}$) 130 supply path. Though only the current supply is shown in FIG. 2, the direct current ($I_{DC}$) 130 return path suffers the same problems. The first current ($I_1$) 132 and the second current ($I_2$) 134 flow in opposite directions into the third transformer 120. Ideally, no magnetic flux imbalance 200 is created in the third transformer 120 by the first current ($I_1$) 132 and the second current ($I_2$) 134 because the first current ($I_1$) 132 equals the second current ($I_2$) and because the first current ($I_1$) 132 and the second current ($I_2$) 134 flow in opposite directions. However, the third transformer 120 and the first pair of communication conductors 102 are not ideal due to problems such as differences in resistance of connector contacts, unequal conductor lengths, unequal conductor resistances, imperfections in windings of the third transformer 120, and other manufacturing imperfections. Thus, the resistances encountered by the first current ($I_1$) 132 and the second current ($I_2$) 134 are not equal. Therefore, the first current ($I_1$) 132 and the second current ($I_2$) 134 are not equal in magnitude when they flow through the third transformer 120.

The inequality of the first current ($I_1$) 132 and the second current ($I_2$) 134 creates the magnetic flux imbalance 200 in the third transformer 120 because a first magnetic flux created by the first current ($I_1$) 132 does not completely cancel a second magnetic flux created by the second current ($I_2$) 134. When the first current ($I_1$) 132 and the second current ($I_2$) 134 are small, a strength of the magnetic flux imbalance 200 is low relative to a strength of a magnetic flux created by the first communication signal 136. However, as power supplied to the powered device 106 increases, the difference between the magnitudes of the first current ($I_1$) 132 and the second current ($I_2$) 134 increases. Thus, the strength of the magnetic flux imbalance 200 also goes up. If power supplied increases sufficiently, the magnetic flux imbalance 200 increases in strength until the magnetic flux imbalance 200 alone saturates the third transformer 120. The magnetic flux imbalance 200 reduces a signal-to-noise ratio of the communication system connection. Saturation of the third transformer 120 causes loss of the first communication signal 136. Saturation also limits power that can be transferred between the power-supplying equipment 100 and the powered equipment 106 while maintaining ability of the communication system connection to transport the first communication signal 136.

It is cost-prohibitive to design the transformer components with sufficient tolerances to remove the flux imbalance. Accordingly, what is needed is a Power-over-Ethernet configuration that reduces or eliminates the magnetic flux imbalance.

BRIEF SUMMARY OF THE INVENTION

A method and apparatus that minimizes a magnetic flux imbalance caused by power transfer in a communication system transformer. The magnetic flux imbalance in a transformer is detected and then minimized. One exemplary apparatus and method for detecting the magnetic flux imbalance alters and measures the transformer's magnetic flux with a first test magnetic flux created by a first test current and a second test magnetic flux created by a second test current.

The first and second test currents are provided by a DC current source coupled to a first and second switch. Activation of the first switch sends the first test current in one direction through a part of a transformer winding. Activation of the second switch sends the second test current through a part of the transformer winding in a direction opposite that of the first test current. The first and second test currents return to the DC current source via a transformer center tap. The DC current source is an array of fixed DC current sources providing currents of differing magnitudes. Each individual fixed DC current source in the array is coupled to the transformer winding via the first and second switches. Multiple DC current sources are coupled to the winding to provide variability of the first and second test currents. Alternatively, the DC current source is a variable current source.

Detection is performed by injecting the first test current into a first half of the transformer winding, thus creating the first test magnetic flux. During application of the first test magnetic flux, a voltage across the entire winding, a voltage between an end of the winding and a tap, and/or a current through a transformer tap are measured. This first measurement determines if the transformer is saturated. The first test current is then stopped. The second test current is then injected into a second half of the winding to create the second test magnetic flux in a direction opposite to that of the first test magnetic flux. During application of the second test magnetic flux, a voltage across the entire winding, a voltage between an end of the winding and a tap, and/or current through a transformer tap are measured. Like the first measurement, the second measurement also determines if the transformer is saturated. The second test current is then stopped. The first measurement is compared to the second measurement to determine a difference. The difference indicates a magnitude and a polarity of the magnetic flux imbalance.

A second exemplary method for detecting the magnetic flux measures a symmetry and an amplitude of a communication signal passed through the transformer. The communication signal becomes asymmetric and/or suffers a reduction in amplitude when the transformer is saturated or near saturation conditions due to a magnetic flux imbalance.

A third exemplary method for detection of the magnetic flux imbalance measures power demand by a powered device. Power demand is measured by measuring the powered device's supply current. If power demand of the powered device increases, the supply current increases. The increase in supply current increases the magnetic flux imbalance.

The magnetic flux imbalance is minimized by injecting a compensation current into the transformer winding to create a compensating magnetic flux that counters the magnetic flux imbalance. The compensation current is provided by the DC current source coupled to the first and second switches. Activation of the first switch sends the compensation current in one direction through the transformer winding. Activation of the second switch sends the compensation current in the opposite direction through the transformer winding. The compensation current returns to the DC current source via the transformer center tap.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and enable a person skilled in the pertinent art to make and use the invention.

In the drawings.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

As introduced above, an approach to minimizing saturation caused by power transfer in a communication system transformer. FIGS. 3-9, described below, illustrate this approach.

Detection and Compensation Circuits

Figure 3:
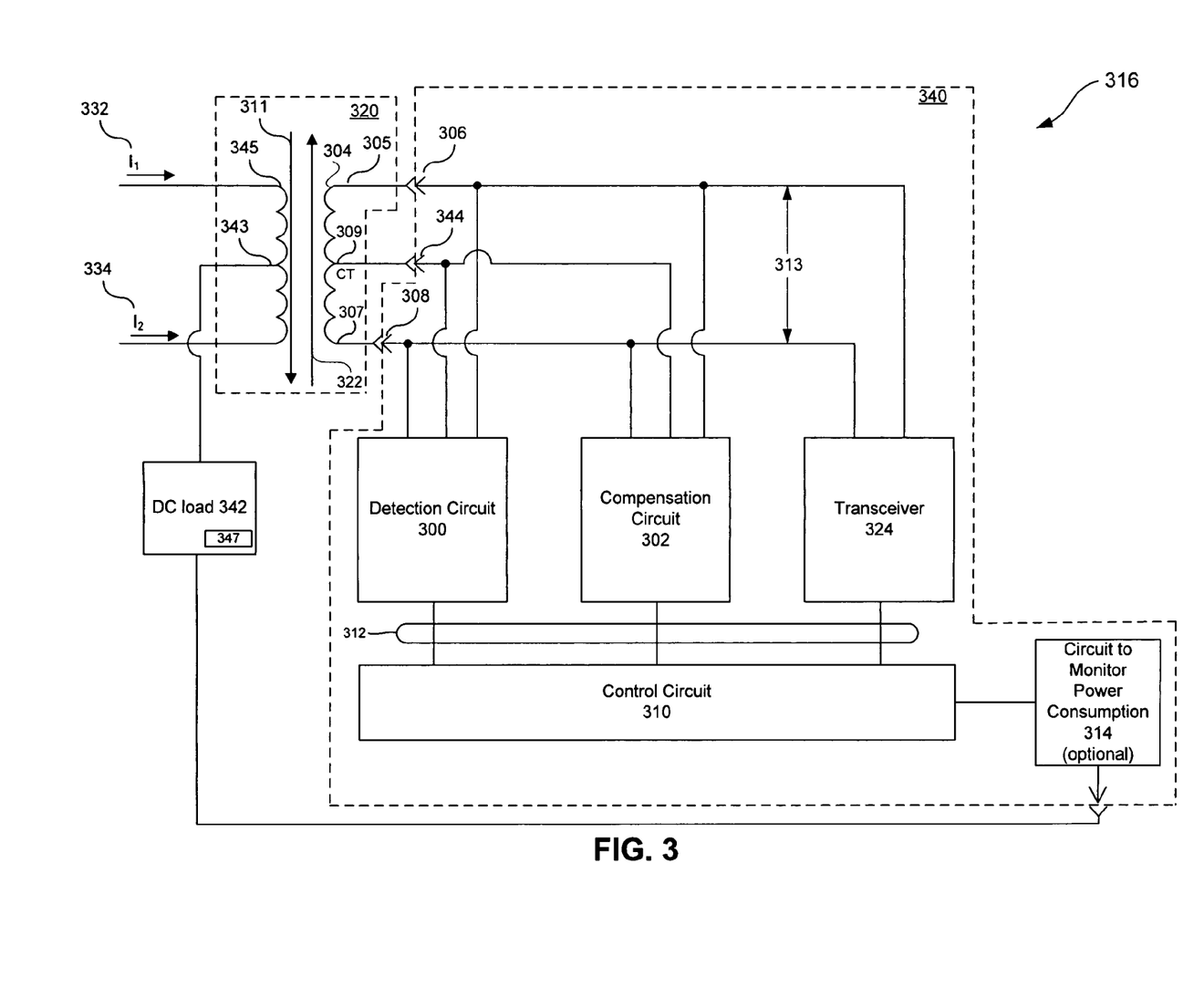
FIG. 3 is a block diagram showing an example of detection and compensation circuits.

FIG. 3 illustrates a powered device 316 according to embodiments of the invention. The powered device 316 detects and minimizes saturation of a transformer 320. The transformer 320 is part of a Power-over-Ethernet system. Alternatively, the transformer 320 is part of a communication system in which power is transferred via communication lines. The powered device 316 has a detection circuit 300, a compensation circuit 302, and a powered device transceiver 324. The winding 304 is at least one device that is located within a magnetic flux of the transformer 320. The winding 304 converts between electrical energy and magnetic energy. The winding 304 is a coil, part of the transformer 320, or a similar device.

The detection circuit 300 senses a magnetic flux imbalance 322 in the transformer 320. The magnetic flux imbalance 322 is caused by inequality of the first current ($I_1$) 332 and the second current ($I_2$) 334. The detection circuit 300 is coupled to a first tap 305, a second tap 307, and a third tap 309 on a winding 304. The first and second taps 305, 307 are at opposite ends of winding 304 and the third tap 309 is a center tap. Alternatively, the first, second, and third taps 305, 307, 309 are located at other points on the winding 304. The detection circuit 300 measures voltage across the winding 304 between the first, second, and third taps 305, 307, 309. Alternatively or additionally, the detection circuit 300 also measures current through the first, second, and/or third taps 305, 307, 309. In examples, the detection circuit 300 is part of a digital receiver's digital to analog converter circuit.

The compensation circuit 302 minimizes the magnetic flux imbalance 322 in the transformer 320. The compensation circuit 302 is also coupled to the first tap 305, the second tap 307, and the third tap 309. The compensation circuit 302 has a current source controlled by a control circuit 310. The compensation circuit 302 injects a compensating current into the winding 304 to create a compensating magnetic flux 311 that minimizes the magnetic flux imbalance 322. In examples, the compensation circuit 302 is part of a digital transmitter's digital to analog converter.

The powered device transceiver 324 transmits and/or receives a communication signal 313 that is passed through the transformer 320. The communication signal 313 is an AC signal. The powered device transceiver 324 is coupled to the first tap 305 and the second tap 307. In examples, the detection circuit 300, the compensation circuit 302, and the powered device transceiver 324 are coupled to different windings located within the magnetic flux of the transformer 320.

A transformer interface including a first conductor 306, a second conductor 308, and a third conductor 344 is coupled to the powered device transceiver 324, the detection circuit 300, and the compensation circuit 302. A transformer interface is an array of conductive elements that couple a die to a circuit external to an integrated circuit package. Examples of a transformer interface include, and are not limited to, a ball grid array (BGA), a pin grid array (PGA), and a small-outline integrated circuit (SOIC). In examples, the transformer interface is a parallel or serial port on an integrated circuit package. In other words, the powered device transceiver 324, the detection circuit 300, the compensation circuit 302, and the control circuit 310 can be integrated on a single silicon substrate, and the transformer interface provides the off-chip physical interface for the integrated circuit.

The transformer 320A supplies power to a DC load 342. The DC load 342 is coupled to a center tap 343 of a second winding 345 of the transformer 320. In examples, the DC load 342 has a DC-DC converter 347. In examples, the center tap 343 is not a center tap, but is a tap located at other points on the winding 304. The first current ($I_1$) 332 and the second current ($I_2$) 334 power the DC load 342. The DC load 342 is, at least in part, the powered device 316 having the detection circuit 300, the compensation circuit 302, the powered device transceiver 324, and the control circuit 310. In other examples, the DC load 342 is other circuitry.

The control circuit 310 manages detection and minimizes the magnetic flux imbalance 322 through the powered device transceiver 324, the detection circuit 300, the compensation circuit 302, and a circuit to monitor power consumption 314. The control circuit 310 is coupled via control lines 312 to the powered device transceiver 324, the detection circuit 300, the compensation circuit 302, and the circuit to monitor power consumption 314.

The circuit to monitor power consumption 314 of the powered device 316 measures power consumption of the DC load 342 by measuring current supplied to the DC load 342. The circuit to monitor power consumption 314 is coupled to the DC load 342 and is optional.

The powered device transceiver 324, the detection circuit 300, and the compensation circuit 302 are deposited on a common substrate 340. The detection circuit 300, the compensation circuit 302, the control circuit 310, and powered device transceiver 324 share common circuitry to save space. In examples, the detection circuit 300, the compensation circuit 302, the control circuit 310, and/or powered device transceiver 324 are discrete circuits.

Figure 4:
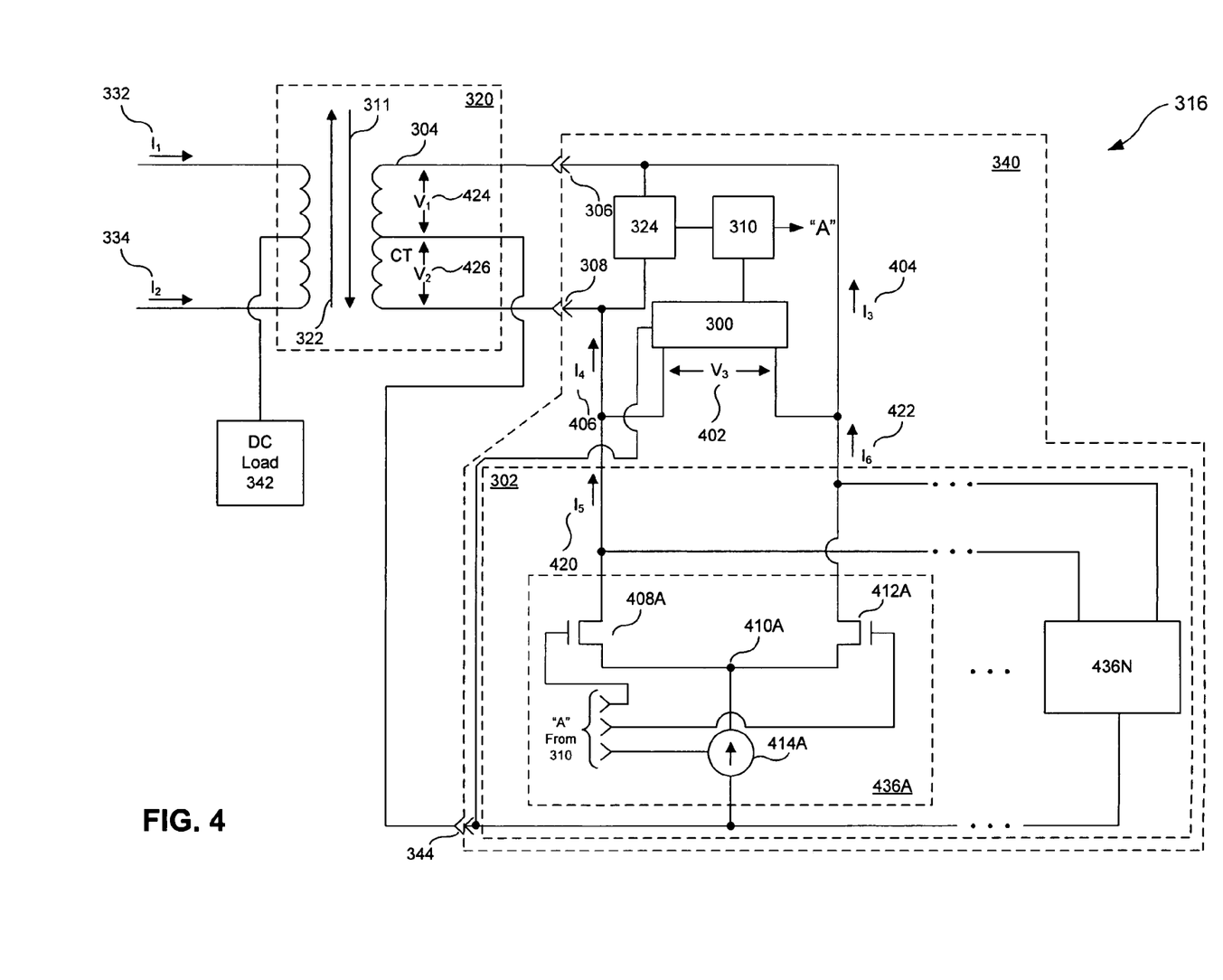
FIG. 4 illustrates an example of a saturation compensation circuit.

FIG. 4 further illustrates the powered device 316, according to embodiments of the invention. The detection circuit 300 measures a first voltage ($V_1$) 424, a second voltage ($V_2$) 426, and a third voltage ($V_3$) 402. The detection circuit 300 produces a signal to the control circuit 310 based on the measurements of the first voltage ($V_1$) 424, the second voltage ($V_2$) 426, and/or the third voltage ($V_3$) 402.

The powered device transceiver 324 detects distortion of a signal passed through the transformer 320 such as communication signal 313. Examples of the types of distortion measured by the powered device transceiver 324 are signal symmetry and amplitude. The powered device transceiver 324 produces a signal to the control circuit 310 based on distortion of the signal.

The compensation circuit 302 minimizes the effect of magnetic flux imbalance 322 in the transformer 320 by creating a compensating magnetic flux 311. The compensation circuit 302 injects a first compensation current ($I_3$) 404 or a second compensation current ($I_4$) 406 through the winding 304 to create the compensating magnetic flux 311. In examples, the compensation circuit 302 is connected in series with the winding 304. The compensating magnetic flux 311 and the magnetic flux imbalance 322 are not limited to the orientation shown in FIG. 4.

The compensation circuit 302 has several stages 436A, . . . , N. An exemplary stage 436A includes a first switch 408A coupled between a common node 410A and a first end of the winding 304 via the first conductor 306. A second switch 412A is coupled between the common node 410A and a second end of the winding 304 via the second conductor 308. A current source 414A is in series with the common node 410A and the third tap 309. The first switch 408A and the second switch 412A control application of the first compensation current ($I_3$) 404 and the second compensation current ($I_4$) 406, from the current source 414A through the winding 304. The first switch 408A and the second switch 412A are transistors. In examples, the current source 414 is comprised of a resistive ladder or a variable current source.

Control Circuit

Figure 5:
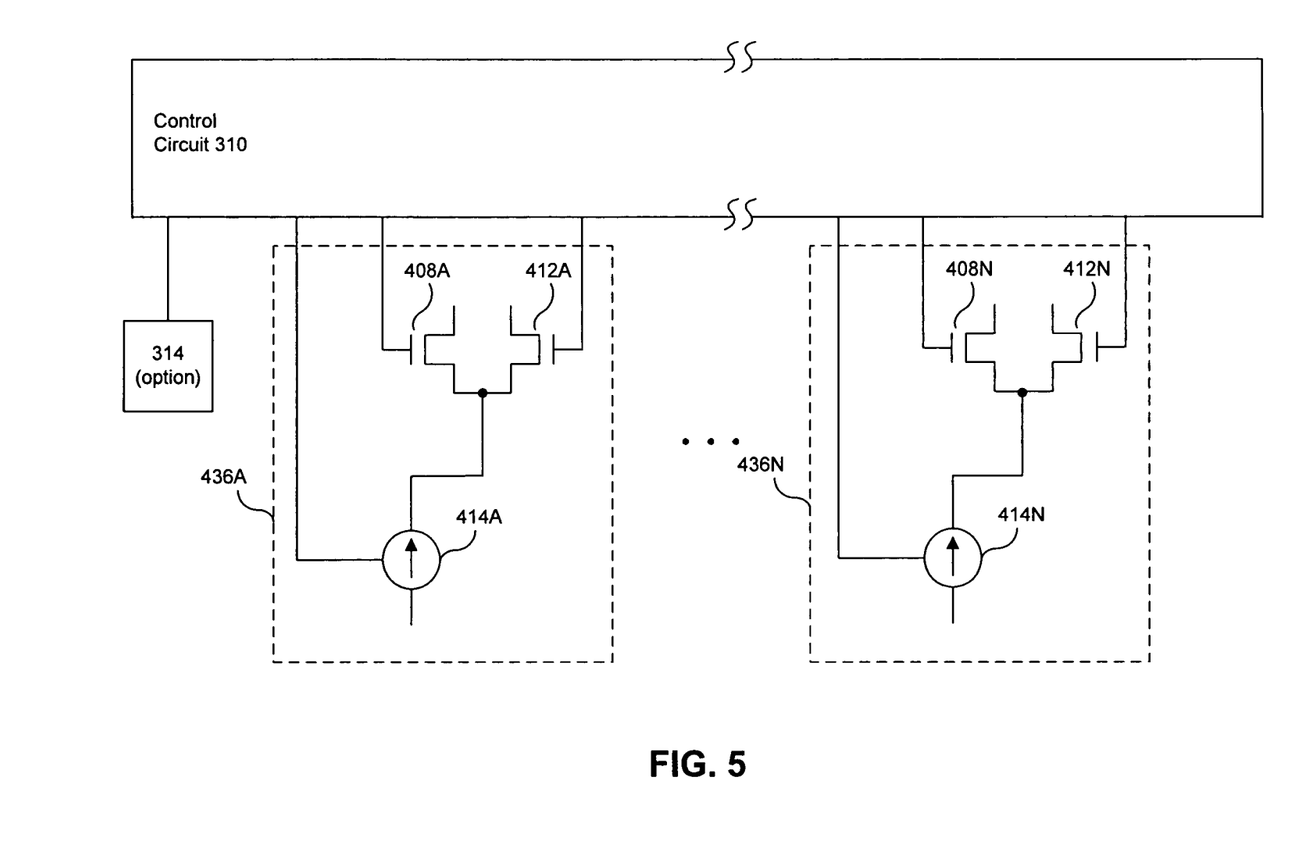
FIG. 5 illustrates an exemplary control circuit.

FIGS. 4 and 5 illustrate coupling of the control circuit 310. The control circuit 310 manages functions performed by circuits in the powered device 316. In examples, the control circuit 310 is a logic circuit and/or a processor. In examples, the control circuit 310 has a computer-readable medium carrying at least one instruction for execution by at least one processor to perform a method for controlling and managing at least one of the powered device transceiver 124, the detection circuit 300, and the compensation circuit 302. In other examples, the control circuit 310 has a computer-readable medium carrying at least one instruction for execution by at least one processor to perform a method for minimizing saturation in the transformer 320.

The control circuit 310 is coupled to the detection circuit 300, the compensation circuit 302, the powered device transceiver 324. The control circuit 310 is also coupled to the first switch 408, the second switch 412, and the current source 414 via the control lines 312. In examples, the control circuit 310 is coupled to other circuits in the powered device.

Magnetic Flux Imbalance Detection and Minimization Overview

Figure 6:
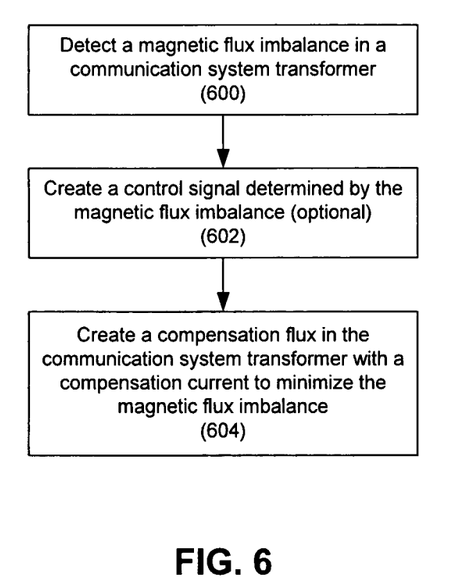
FIG. 6 is a flowchart of an exemplary method for detecting and minimizing magnetic flux imbalances.

FIG. 6 provides an overview of a magnetic flux imbalance detection and minimization process according to embodiments of the invention. First, at step 600, a magnetic flux imbalance is detected. Second, at step 602, a control signal determined by the magnetic flux imbalance is produced. Step two is optional. Third, at step 604, a compensating magnetic flux is created to minimize the magnetic flux imbalance. If step two is executed, the compensating magnetic flux is controlled by the control signal.

Detection of Magnetic Flux Imbalance

The detection circuit 300 detects the magnetic flux imbalance 322 in the transformer 320. Detecting occurs during transmission of a handshaking signal. Alternatively, detecting occurs during presence or absence of the communication signal 313 in the transformer 320. In examples, the detection circuit 300 detects the magnetic flux imbalance 322 in the transformer 320 only once during a communication link, periodically detects, occasionally detects, or continuously detects.

One exemplary method of magnetic flux imbalance 322 detection alters a transformer's magnetic flux with a test magnetic flux. The test magnetic flux is generated by sequentially injecting a first test current ($I_5$) 420 and a second test current ($I_6$) 422 into the winding 304. The test magnetic flux exists about both a part of the winding 304 to which the first test current ($I_5$) 420 and the second test current ($I_6$) 422 are injected as well as the other part in which no current is injected. The winding 304 is exposed to both the test magnetic flux and the magnetic flux imbalance 322. Orientation of the magnetic flux imbalance 322 and the test magnetic flux can occur in similar or opposite directions, and thus add or subtract in their effect on the winding 304. The magnetic flux imbalance 322 in the transformer 320 is detected by measuring a third voltage ($V_3$) 402. Alternatively, a first voltage ($V_1$) 424 and/or a second voltage ($V_2$) 426 are measured. When flow of the first test current ($I_5$) 420 or the second test current ($I_6$) 422 stops, the test magnetic flux in and around the winding 304 collapses, generating the first voltage ($V_1$) 424, the second voltage ($V_2$) 426, and third voltage ($V_3$) 402. Thus, the third voltage ($V_3$) 402 across the winding 304 when the test magnetic flux collapses differs in polarity and magnitude in the presence of the magnetic flux imbalance 322, dependent upon the direction of the magnetic flux imbalance 322.

In other examples, the magnetic flux imbalance 322 is detected by measuring the first test current ($I_5$) 420, the second test current ($I_6$) 422, and at least one of the first voltage ($V_1$) 424, the second voltage ($V_2$) 426, and the third voltage ($V_3$) 402 during creation of the test magnetic flux. The first test current ($I_5$) 420 and the second test current ($I_6$) 422 are sequentially injected into the winding 304 to create the test magnetic flux. During saturation conditions, as the first test current ($I_5$) 420 or the second test current ($I_6$) 422 increases, the first voltage ($V_1$) 424, the second voltage ($V_2$) 426, and the third voltage ($V_3$) 402 do not change, or only change slightly. Also, if the transformer 320 has a magnetic flux imbalance 322, it is easier to saturate the transformer 320 with either the first test current ($I_5$) 420 or the second test current ($I_6$) 422. Thus, comparison of the magnitudes of the first test current ($I_5$) 420 and the second test current ($I_6$) 422 at the onset of saturation also indicates the presence of the magnetic flux imbalance 322.

A second exemplary method of detecting a magnetic flux imbalance 200 detects by measuring the communication signal 313 that has passed through the transformer 320. The magnetic flux imbalance 322 in the transformer 320 causes changes in symmetry and/or amplitude of the communication signal 313. These changes occur due to saturation or near saturation conditions in one direction within the transformer 320. Detection includes measuring the communication signal 313 for degradation in symmetry, waveform shape, and/or amplitude. A clipping detector tests for changes in symmetry and amplitude of the communication signal 313.

A third exemplary method of magnetic flux imbalance 322 detection measures changes in power demand by the DC load 342. Power demand is measured by detecting a supply current drawn from the center tap 343 of the second winding 345. Alternatively, power demand is measured by detecting a change in a supply voltage sensed at the center tap 343. If the DC load 342 power demand increases, then a magnetic flux imbalance 322 will also increase. If the DC load 342 power demand decreases, then the magnetic flux imbalance 322 will decrease.

Control Signals

The control circuit 310 issues control signals to actuate the first switch 408 and/or the second switch 412 during magnetic flux imbalance detection and minimization. During minimization, the control signals issued by the control circuit 310 are based upon the strength and the direction of the magnetic flux imbalance 322.

In examples, the control circuit 310 implements an algorithm to control the detection circuit 300, the compensation circuit 302, and/or the powered device transceiver 324. An algorithm also processes the output of the detection circuit 300 to control the compensation circuit 302. Within the compensation circuit 302, timing, magnitude, and direction of the first compensation current ($I_3$) 404, and the second compensation current ($I_4$) 406 are controlled by the control circuit 310. The control circuit 310 also controls actuation of the first switch 408 and/or the second switch 412. In examples where the DC current source 414 is a variable current source, the control circuit 310 controls variation of the DC current source 414.

Minimization of Magnetic Flux Imbalance

The compensation circuit 302 minimizes the magnetic flux imbalance 322 by injecting the first compensation current ($I_3$) 404 and/or the second compensation current ($I_4$) 406 into the winding 304. The first compensation current ($I_3$) 404 and/or the second compensation current ($I_4$) 406 creates the compensating magnetic flux 311 in the transformer 320. The first compensation current ($I_3$) 404 and the second compensation current ($I_4$) 406 are a variable magnitude DC current. In examples, the first compensation current ($I_3$) 404 and the second compensation current ($I_4$) 406 each have a fixed magnitude. The compensation circuit 302 operates without regard to absence or presence of the communication signal 313 in the transformer 320.

In an exemplary method, a control signal actuates the first switch 408 and/or the second switch 412 to inject the first compensation current ($I_3$) 404 or the second compensation current ($I_4$) 406 into the winding 304 to create the compensating magnetic flux 311 that minimizes the magnetic flux imbalance 322. Actuation of the first switch 408 directs the flow of the second compensation current ($I_4$) 406 in one direction through the winding 304. Actuation of the second switch 412 directs the flow through the winding 304 of the first compensation current ($I_3$) 404 in a opposite direction from that of the second compensation current ($I_4$) 406.

In another exemplary method, the control circuit 310 actuates a quantity of first switches 408 and/or second switches 412 within multiple stages 436. This actuation changes the magnitude of the first compensation current ($I_3$) 404 or the second compensation current ($I_4$) 406 injected into the winding 304 by selectively coupling a quantity of the fixed DC current sources 414 to the winding 304.

In another exemplary method, the control circuit 310 adjusts the variable DC current source 414 to select a magnitude of the first compensation current ($I_3$) 404 and/or the second compensation current ($I_4$) 406.

Figure 7:
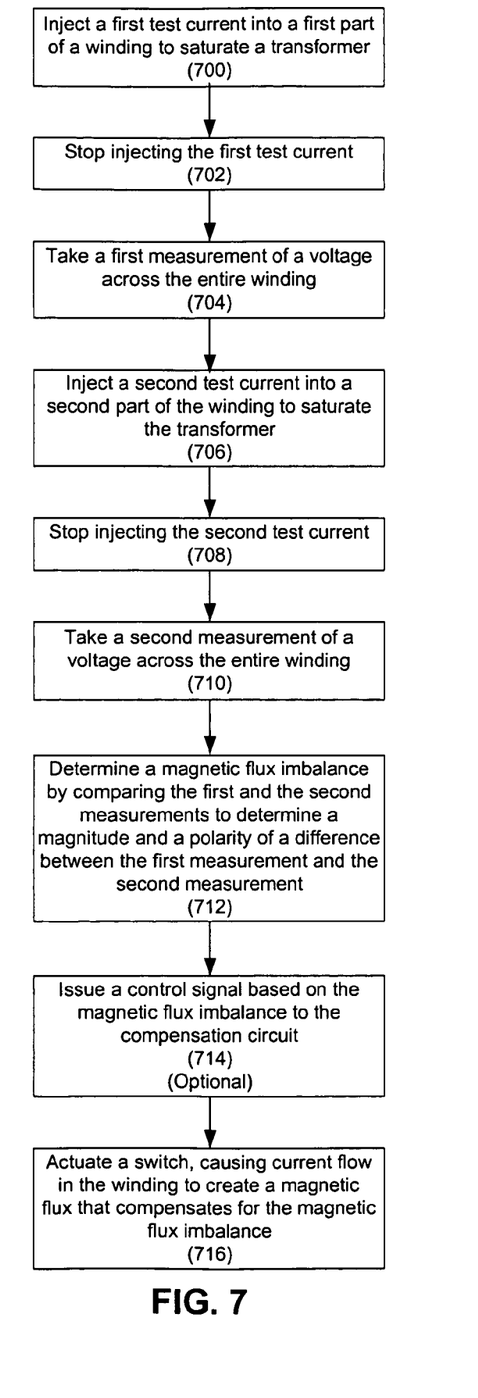
FIG. 7 is a flowchart of another exemplary method for detecting and minimizing magnetic flux imbalances.

One exemplary method to detect and minimize the magnetic flux imbalance 322 is shown in FIG. 7. At step 700, the first switch 408 is actuated to inject the first test current ($I_5$) 420 into a first part of the winding 304 to saturate the transformer 320. At step 702, flow of the first test current ($I_5$) 420 is stopped. At step 704, during cessation of the first test current ($I_5$) 420 flow, a first measurement of the third voltage ($V_3$) 402 is taken. At step 706, the second switch 408 is actuated to inject the second test current ($I_6$) 422 into a second part of the winding 304 in a direction opposite that of the first test current ($I_5$) 420 to saturate the transformer 320. At step 708, flow of the second test current ($I_6$) 422 is stopped. At step 710, during cessation of the second test current ($I_6$) 422 flow, a second measurement of the third voltage ($V_3$) 402 is taken. At step 712, the first measurement of the third voltage ($V_3$) 402 is compared to the second measurement of the third voltage ($V_3$) 402 to determine a differential voltage. A magnitude and a polarity of the differential voltage indicates a direction and strength of the magnetic flux imbalance 322. At step 714, a control signal is issued to the compensation circuit 302 based upon the magnetic flux imbalance 322. Step 714 is optional. At step 716, the first switch 408 and/or the second switch 412 are selected and actuated, causing the first compensation current ($I_3$) 404 or the second compensation current ($I_4$) 406 to flow in the winding 304 to create the compensating magnetic flux 311 that minimizes the magnetic flux imbalance 322.

Figure 8:
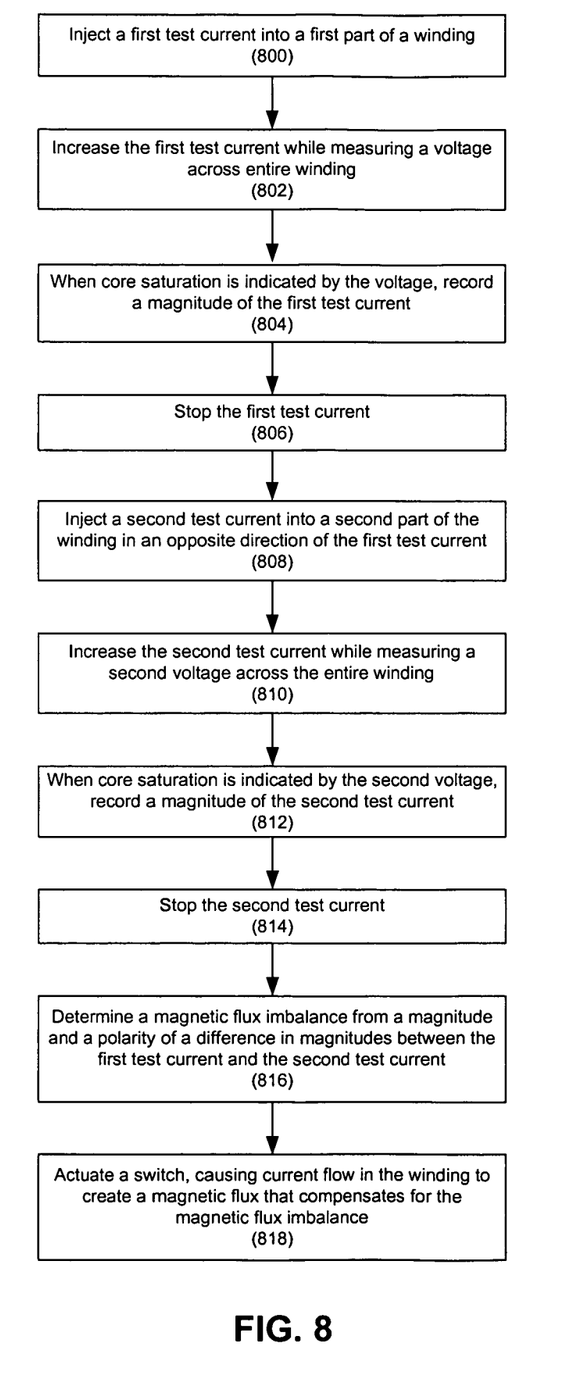
FIG. 8 is a flowchart of another exemplary method for detecting and minimizing magnetic flux imbalances.

An exemplary method to detect and minimize the magnetic flux imbalance 322 is shown in FIG. 8. At step 800, the detection circuit 300 injects the first test current ($I_5$) 420 into a first part of the winding 304. At step 802, the first test current ($I_5$) 420 is increased while the third voltage ($V_3$) 402 across the winding 304 is measured. At step 804, when the transformer 320 saturation is detected from the third voltage ($V_3$) 402, a magnitude of the first test current ($I_5$) 420 is recorded. At step 806, flow of the first test current ($I_5$) 420 is stopped. At step 808, the detection circuit 300 then injects the second test current ($I_6$) 422 into a second part of the winding 304. At step 810, the second test current ($I_6$) 422 is increased while measuring the third voltage ($V_3$) 402 across the winding 304. At step 812, when saturation of the transformer 320 is detected from the third voltage ($V_3$) 402 measurement, a magnitude of the second test current ($I_6$) 422 is recorded. At step 814, flow of the second test current ($I_6$) 422 is stopped. At step 816, a magnitude and a polarity of a difference between the first test current ($I_5$) 420 measurement and the second test current ($I_6$) 422 measurement indicates the direction and strength of the magnetic flux imbalance 322. At step 818, a switch, for example, the first switch 408 and/or the second switch 412, is actuated, causing current flow, such as the first compensation current ($I_3$) 404 and/or the second compensation current ($I_4$) 406 to flow in the winding 304 to create a compensating magnetic flux 311 that minimizes the magnetic flux imbalance 322.

Figure 9:
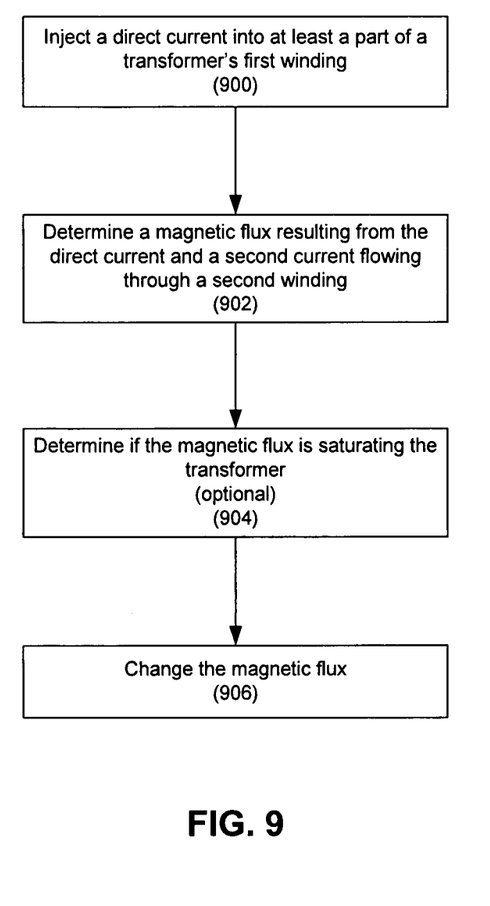
FIG. 9 is a flowchart of another exemplary method for detecting and minimizing magnetic flux imbalances.

Another exemplary method to detect and minimize a magnetic flux imbalance is shown in FIG. 9. At step 900, a direct current is injected into at least part of a transformer's first winding. At step 902, a magnetic flux resulting from the direct current and a second current flowing through a second winding is determined. In step 904, saturation of the transformer by the magnetic flux is determined. Step 904 is optional. At step 906, the magnetic flux is changed.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A powered device that receives DC power and data over a communications link, the powered device comprising:
   a transformer configured to provide isolation between said communications link and said powered device, said transformer having a first winding coupled to said communications link and a second winding coupled to a data transceiver;
   a flux detection circuit, coupled to said second winding of said transformer, that detects a primary magnetic flux associated with said DC power provided over said communications link, wherein said flux detection circuit is configured to:
      inject a first test current into a first part of said second winding to saturate said transformer and measure a first voltage across said second winding,
      inject a second test current into a second part of said second winding to saturate said transformer and measure a second voltage across said second winding, and
      determine said primary magnetic flux using values of said first and second test currents that saturated said transformer or said first and second measured voltages; and
   a compensation circuit, coupled to said second winding of said transformer, configured to produce a DC cancellation current in said second winding of said transformer, said DC cancellation current causing a secondary magnetic flux in said transformer having a polarity opposite that of said primary magnetic flux.

2. The powered device of claim 1, wherein said compensation circuit includes a variable current source configured to produce a variable current that is steered to one of first and second taps of said second winding of said transformer.

3. The powered device of claim 2, wherein said variable current is adjusted so that said secondary magnetic flux has a magnitude substantially similar to that of said primary magnetic flux, and wherein said variable current is steered to one of said first and second taps of said second winding so that said secondary magnetic flux has a polarity opposite that of said primary magnetic flux.

4. The powered device of claim 3, further comprising a control circuit configured to control said variable current source based on an output of said flux detection circuit.

5. A transceiver that reduces transformer saturation caused by power transfer in a communication system, comprising:
   a transformer interface including:
      a first conductor,
      a second conductor, and
      a third conductor;
   a saturation compensation circuit including:
      a first switch coupled between said first conductor and a node,
      a second switch coupled between said second conductor and said node, and
      a direct current source coupled between said node and said third conductor;
   a means to measure at least one of a voltage between two of said first, second, and third conductors, a first current through said first conductor, and a second current through said second conductor, wherein said means to measure:
      injects a first test current into a first winding of a transformer between said first and third conductors to saturate said transformer and measuring a first voltage across said first winding, said transformer is connected to said transformer interface,
      injects a second test current into a second winding of said transformer between said second and third conductors to saturate said transformer and measuring a second voltage across said second winding, and determines a magnetic flux imbalance using values of said first and second test currents that saturated said transformer or said first and second measured voltages; and a control circuit coupled to said first switch, said second switch, and said means to measure.

6. The transceiver of claim 5, wherein said direct current source is

7. The transceiver of claim 5, wherein said control circuit is coupled to said direct current source.

8. The transceiver of claim 5, wherein said saturation compensation circuit, said means to measure, and said control circuit are deposited on a common substrate.

9. The transceiver of claim 5, wherein at least one of said first switch, said second switch, and said direct current source comprises a transistor.

10. The transceiver of claim 5, further comprising:
a transformer including:
a first winding having a first tap coupled to said first conductor, a second tap coupled to said second conductor, and a third tap coupled to said third conductor; and
a second winding having a fourth tap; and
a direct current load coupled to said fourth tap.

11. The device of claim 10, wherein at least one of said third tap and said fourth tap is a center tap.

12. The device of claim 10, wherein said first tap is at a first end of said first winding.

13. The device of claim 10, wherein said second tap is at a second end of said first winding.

14. The device of claim 10, wherein said direct current load includes a direct current-to-direct current converter, 15. A method for controlling a magnetic flux imbalance in a communication system transformer, comprising:
detecting said magnetic flux imbalance in said communication system transformer, said detecting including:
injecting a first test current into a first part of a winding of said communication system transformer to saturate said communication system transformer and measuring a first voltage across said winding,
injecting a second test current into a second part of said winding to saturate said communication system transformer and measuring a second voltage across said winding, and
determining said magnetic flux imbalance using values of said first and second test currents that saturated said communication system transformer or said first and second measured voltages; and
creating a compensation flux in said communication system transformer to minimize said magnetic flux imbalance.

16. The method of claim 15, further comprising creating a control signal determined by said magnetic flux imbalance, wherein said control signal controls said compensation flux.

17. The method of claim 16, wherein said control signal controls a compensation current to control said compensation flux.

* * * * *

UNITED STATES PATENT AND TRADEMARK OFFICE
CERTIFICATE OF CORRECTION

| | | |
|---|---|---|
| PATENT NO. | : 8,643,218 B2 | Page 1 of 1 |
| APPLICATION NO. | : 11/495677 | |
| DATED | : February 4, 2014 | |
| INVENTOR(S) | : Fallahi et al. | |

It is certified that error appears in the above-identified patent and that said Letters Patent is hereby corrected as shown below:

In the Claims

Column 11, Line 8, please replace "source is" with --source is variable.--.

Signed and Sealed this
Nineteenth Day of August, 2014

Michelle K. Lee
*Deputy Director of the United States Patent and Trademark Office*